Feb. 6, 1962 B. W. GUSTAFSON 3,019,586
RAKE TOOTH MEANS
Filed Aug. 22, 1957
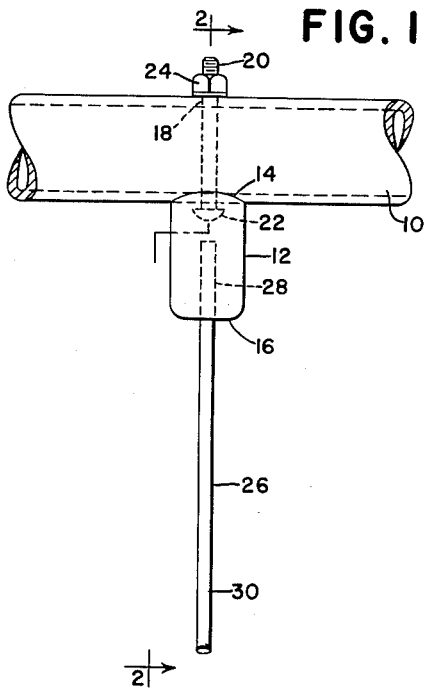
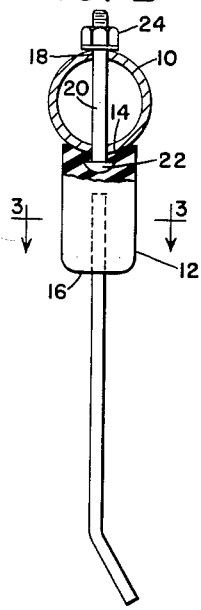
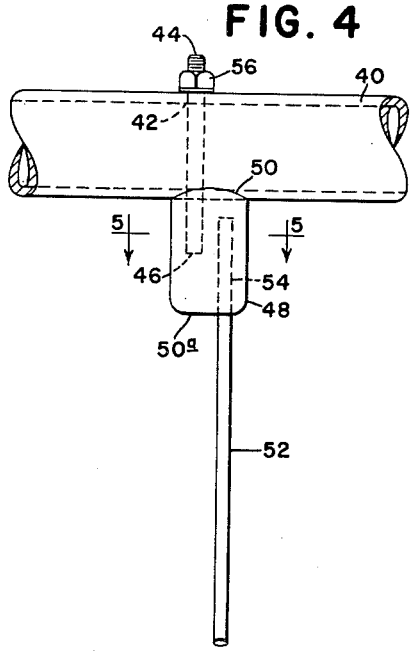
INVENTOR.
B. W. GUSTAFSON

United States Patent Office 3,019,586
Patented Feb. 6, 1962

3,019,586
RAKE TOOTH MEANS
Blaine W. Gustafson, Ottumwa, Iowa, assignor, by mesne assignments, to Deere & Company, a corporation of Delaware
Filed Aug. 22, 1957, Ser. No. 679,712
17 Claims. (Cl. 56—400)

This invention relates to a rake tooth means particularly adapted for a side-delivery rake or equivalent implement.

The general object of the invention is to provide an improved rake tooth means and mounting therefor. More specifically, the invention features the utilization of mounting means including a block of rubber or similar elastomer material with a mounting member projecting from one end and a rake tooth projecting from the other end. The invention further features two forms of design, in one of which the rubber block is operative primarily in bending when subjected to normal loads and in the other of which the block is placed in shear when subjected to normal loads. The advantage of the rubber block is that it will not take a permanent set because of extreme or abnormal conditions, such as when the tooth is abnormally deflected laterally, as by jumping over the adjacent stripper bar.

The foregoing and other advantages and features inherent in and encompassed by the invention will become apparent as preferred embodiments thereof are disclosed in detail in the ensuing specification and accompanying sheet of drawings, the several figures of which are described immediately below.

FIG. 1 is a fragmentary elevation of one form of the invention.

FIG. 2 is a section on the line 2—2 of FIG. 1.

FIG. 3 is a section on the line 3—3 of FIG. 2.

FIG. 4 is a view similar to FIG. 1 but showing a different form of the invention.

FIG. 5 is a section on the line 5—5 of FIG. 4.

As indicated, the improved rake tooth mounting is designed primarily for use with a side-delivery rake, and in the drawings the numeral 10 represents a typical rake bar, the rake bar here being of cylindrical section as is conventional; although, other shapes are not excluded. A mounting block or element 12 of rubber or similar elastomer material has opposite ends 14 and 16, the former of which is concave in shape so as to conform in part to part of the surface of the cylindrical rake bar 10 and to form a first joint between the block and bar, the block thereby nesting against the surface of the bar and in register with a diametrical opening 18 through diametrically opposed wall or supporting portions of the bar.

The block 12 has means for the attachment thereof to the bar 10, one part of said means being the concave end 14 and as another part thereof the block carries at its end 14 a mounting member, here in the form of a bolt 20 which projects through the aperture 18. The bolt is headed at 22 and the headed portion is secured to the block 12, preferably by being molded therein or bonded thereto. The exposed portion of the bolt projects from the end 14 of the block 12 and a nut 24 is threaded thereon to comprise fastener means providing a second joint between the block and bar so that the assembly comprising the bolt and the block is rigidly secured to the bar 10 as a yieldable arm radial to the length or axis of the bar.

A rake tooth 26, which may be of conventional spring steel, has a portion 28 thereof embedded in or bonded to the block 12 and a free or terminal end portion 30 projecting from the end 16 of the block generally as a prolongation of the arm established by the block. In the form of the invention shown in FIGS. 1, 2 and 3, the tooth 26 and bolt 20 are coaxial and normal loads imposed on the assembly during operation place the block 12 in bending. Column loads encountered are taken by the block 12 in compression. The portion of the block intermediate the bolt 20 and the embedded end 28 of the tooth may be regarded as yieldable elastomer means and the distance between the headed end 22 of the bolt and the embedded end 28 of the tooth 26 may be varied to accomplish different load deflection rates. Because of the inherent flexibility in the block, which may be of solid molded rubber, the tooth 26 is capable of withstanding extreme abnormalities in use, because the block will not take a permanent set, as will conventional rake tooth assemblies involving coil springs and the like. The concavity at the upper end 14 of the block enables the block to nest against the bar 10, which thereby prevents the assembly from twisting about its own axis, which is, of course, the common axis of the bolt 20 and tooth 26.

In the modified form of the invention shown in FIGS. 4 and 5, a rake bar 40 is identical to the bar 10 and has therein a diametrical aperture 42 through which a mounting member or bolt 44 extends. This bolt is part of the modified form of rake tooth assembly and its lower end at 46 is embedded in a block 48 similar to the block 12. This block has an upper concave end 50 which nests against the bar 40 and further has a lower end 50a from which a rake tooth 52 projects. This rake tooth has an inner end 54 embedded in the block 48 and in general the assembly is similar to that described above. The important exception is that the embedded ends 46 and 54 of the bolt and rake tooth respectively are laterally offset and furthermore these ends are in overlapping relationship. Hence, in operation, when loads are encountered by the tooth 52, the block 48 is placed primarily in shear, and the same reaction is incident to column loads applied to the rake tooth.

A nut 56 is threaded onto the bolt 44 at the side of the bar 40 opposite to the assembly and rigidly secures the assembly in place. The concavity at 50 prevents twisting of the block about its own axis; although, limited twisting of the block itself may occur when certain types of loads are encountered by the tooth.

It will be seen from the foregoing that both forms of the invention are simple in construction and are so designed that they may be readily mounted on and dismounted from rake bars such as those illustrated. In addition, the assemblies lend themselves to replacement purposes for replacing conventional rake tooth units. The mounting means in each case, utilizing the single bolt, is simple, enabling ready replacement of a unit in the event of extreme damage thereto.

The foregoing and other features, in addition to those already enumerated, will readily occur to those versed in the art, as will variations in the preferred embodiments disclosed, all of which may be achieved without departure from the spirit and scope of the invention.

What is claimed is:

1. Rake tooth means adapted for mounting on a rake bar of cylindrical section having an aperture diametrically therethrough, comprising: a mounting block of elastomer material having opposite ends and disposed radially as respects the bar with one of its ends engaging the bar in register with the aperture and of concave shape so as to receive the bar and hold the block against twisting about its own axis relative to the bar; a bolt having a portion embedded in the block and a portion projecting from said one end and through said aperture; nut means on the projecting portion of the bolt at the diametrically opposite side of the bar for securing the block to the bar; and a rake tooth separate from the bolt and having a portion embedded in the block and a portion projecting from the other end of said block.

2. The invention defined in claim 1, in which: the embedded portions of the bolt and tooth are coaxial in the block.

3. The invention defined in claim 1, in which: the embedded portions of the bolt and tooth are laterally offset in the block and said embedded portions are in overlapping relation to each other.

4. Rake tooth means adapted for mounting on a rake bar of cylindrical section having an aperture diametrically therethrough, comprising: a mounting block of elastomer material having opposite ends and disposed radially as respects the bar with one of its ends engaging the bar in register with the aperture; a bolt having a portion embedded in the block and a portion projecting from said one end and through said aperture; nut means on the projecting portion of the bolt at the diametrically opposite side of the bar for securing the block to the bar; and a rake tooth separate from the bolt and having a portion embedded in the block and a portion projecting from the other end of said block.

5. The invention defined in claim 4, in which: the embedded portions of the bolt and tooth are coaxial in the block.

6. The invention defined in claim 4, in which: the embedded portions of the bolt and tooth are laterally offset in the block and said embedded portions are in overlapping relation to each other.

7. Rake tooth means adapted for mounting on a rake bar, comprising: a mounting block of elastomer material; means for attaching the block to the bar and having a bar-contacting portion directly engageable with the bar, said means including a bolt having a portion embedded in the block and a portion extending from one end of the block; and a rake tooth having a portion embedded in the block and a portion extending from the opposite end of said block.

8. The invention defined in claim 7, in which: the mounting member and tooth are coaxial.

9. The invention defined in claim 7, in which: the mounting member and tooth are offset laterally of the block and their embedded portions are in overlapping relation to each other.

10. Rake tooth means adapted for mounting on a rake bar of cylindrical section having an aperture diametrically therethrough, comprising: a mounting block of elastomer material having opposite ends and disposed radially as respects the bar with one of its ends of concave shape and engaging the bar so as to serve in holding the block against twisting about its own axis relative to the bar, said one end having a portion in register with the bar aperture; a bolt extending from said portion and projecting through said aperture, and nut means on the bolt at the opposite end thereof for securing the block to the bar; and a rake tooth separate from the bolt and having a portion embedded in the block and a portion projecting from the other end of said block.

11. Rake tooth means adapted for mounting on a rake bar, comprising: a mounting block of elastomer material having opposite ends and disposed transverse to the length of the bar with one of its ends engaging the bar and its other end spaced from the bar, said one end being configured to at least partially embrace the bar to serve in holding the block against twisting about its own axis relative to the bar; fastener means of material other than that of the block and engaged between the block and the bar and securing the two together in addition to the aforesaid engagement between said block and bar; and a rake tooth separate from the fastener means and of relatively rigid material other than the block and having a portion embedded in the block and a portion projecting from the other end of said block.

12. Rake tooth means adapted for mounting on a rake bar, comprising: a mounting block of elastomer material having spaced apart portions and disposed adjacent to the bar with one of said portions proximate to the bar and the other of said portions spaced from the bar; mounting means cooperative between the block and the bar and including a first element comprising said one portion of the block and a second element of relatively rigid material different from that of the block and secured to said one portion, at least one of said elements being configured substantially according to at least part of the shape of the bar so as to at least partially embrace the bar and at least one of said elements directly engaging the bar whereby said elements mount the block on the bar as a resilient arm normal to the length of the bar and held against twisting relative to the bar about an axis lengthwise of that arm; and a rake tine of relatively stiff material different from that of the block and secured to the block and projecting from and beyond said other portion of the block as an extension of said arm so that forces applied to the tine transversely of the length thereof tend to stress the block in bending in an area of the block intermediate said block portions.

13. Rake tooth means adapted for mounting on a rake bar, comprising: a mounting block of elastomer material having spaced apart portions and disposed adjacent to the bar with one of said portions proximate to the bar and the other of said portions spaced from the bar; mounting means cooperative between the block and the bar for securing the two together and including a fastener element of relatively rigid material different from that of the block and connecting the block to the bar as a yieldable arm anchored to the bar at said one portion and extending normal to the length of the bar and terminating at said other portion; and a rake tine of relatively stiff material different from that of the block and secured to the block in spaced relation to said one portion and projecting beyond said other portion of the block as an extension of said said arm so that forces applied to the tine in any direction transversely of the length thereof tend to stress the block in bending in an area thereof intermediate said portions.

14. Rake tooth means adapted for mounting on a rake bar, comprising: a mounting element having opposite ends and arranged adjacent to the bar with one end proximate to and the other end spaced from the bar and positioned to provide an arm radial to the length of the bar, said one end being configured relative to the bar so as to engage the bar in such manner as to prevent the element from twisting about an axis radial to the bar and lengthwise of said arm, fastener means between the element and the bar for attaching the element to the bar, a rake tooth of relatively rigid material and separate from the fastener means and disposed in projecting relation to said other end of the element as a prolongation of said arm, and elastomer means connecting the rake tooth to the element and interposed between and structurally separating said tooth and the fastener means to provide in said arm a resilient flexible portion capable of being stressed in bending transversely to said axis when forces are applied to said tooth transversely of the length thereof.

15. Rake tooth means adapted for mounting on a rake bar having spaced supporting portions, comprising: an elastomer element having means for the attachment thereof to the bar, said means including a part on the element directly engaging one of the bar portions, said part and said one bar portion being complementarily shaped to provide a first joint between the bar and the element and said means including a fastener device connected to the element and to the other supporting portion of the bar to provide a second joint between the bar and element; and a rake tooth of relatively rigid material other than that of the element and secured to the element in spaced relation to the fastener device so that forces applied to the tooth tend to flex the element.

16. Rake tooth means adapted for mounting on a tubular rake bar having diametrically opposed wall portions, comprising: an elastomer element having means for the attachment thereof to the bar, said means including a part on the element directly engaging one of the wall portions, said part and said one wall portion being complementarily shaped to provide a first joint between the bar and the element and said means including a fastener device connected to the element and to the other wall portion of the bar to provide a second joint between the bar and element; and a rake tooth of relatively rigid material other than the element and secured to the element in spaced relation to the fastener device so that forces applied to the tooth tend to flex the element.

17. Rake tooth means for mounting on a rake bar comprising: a block of elastomer material having first and second opposite ends between which its principal axis extends; a relatively stiff rake tooth secured to the first end of the block generally as a prolongation of the block along said principal axis; and a relatively rigid mounting member for mounting the block at its second end on the bar with said principal axis normal to the bar so that forces applied to the tooth transversely thereof stress the block in bending transversely to said axis, said member having a first portion adapted to be secured to the rake bar and a second portion of enlarged nature as respects said first portion and having a substantial area thereof transverse to said axis embedded in the block at said second end.

References Cited in the file of this patent
UNITED STATES PATENTS

| | | |
|---|---|---|
| Re. 22,280 | Lord | Mar. 2, 1943 |
| 227,604 | Witter | May 11, 1880 |
| 1,297,907 | Rand | Mar. 18, 1919 |
| 1,569,527 | Patterson | Jan. 12, 1926 |
| 2,092,919 | Johnson | Sept. 14, 1937 |
| 2,205,249 | Fitzgerald et al. | June 18, 1940 |
| 2,328,121 | Bartek | Aug. 31, 1943 |
| 2,599,715 | Lepper | June 10, 1952 |
| 2,627,159 | Russell | Feb. 3, 1953 |
| 2,664,691 | Wiebe | Jan. 5, 1954 |
| 2,704,150 | Scranton | Mar. 15, 1955 |

FOREIGN PATENTS

| | | |
|---|---|---|
| 744 | Great Britain | 1912 |
| 379,808 | Great Britain | Sept. 8, 1937 |